United States Patent [19]

Ericsson et al.

[11] Patent Number: 5,689,592
[45] Date of Patent: Nov. 18, 1997

[54] PARALLEL PROCESSING OF DIGITAL SIGNALS IN A SINGLE ARITHMETIC/LOGIC UNIT

[75] Inventors: Staffan Ericsson, Brookline; John Bruder, Arlington, both of Mass.; Bernd Girod, Spardorf, Germany

[73] Assignee: Vivo Software, Inc., Waltham, Mass.

[21] Appl. No.: 172,323

[22] Filed: Dec. 22, 1993

[51] Int. Cl.⁶ .................................................. G06K 9/54
[52] U.S. Cl. ..................... 382/304; 382/302; 382/307; 360/39
[58] Field of Search ....................... 379/334, 257; 382/49, 302, 304; 381/16; 348/496; 360/39; 331/25

[56] References Cited

U.S. PATENT DOCUMENTS

| | | | |
|---|---|---|---|
| 3,878,473 | 4/1975 | Furtney, Jr. .............................. | 331/25 |
| 3,882,540 | 5/1975 | Ottesen ................................... | 360/39 |
| 4,323,731 | 4/1982 | Hershberger ............................ | 381/16 |
| 4,665,551 | 5/1987 | Sternberg et al. ....................... | 382/49 |
| 4,669,114 | 5/1987 | Reesor et al. ........................... | 379/257 |
| 4,912,549 | 3/1990 | Altman et al. .......................... | 348/496 |
| 4,975,947 | 12/1990 | Chauvel ................................. | 379/334 |
| 5,218,647 | 6/1993 | Blonstein et al. ...................... | 382/17 |

FOREIGN PATENT DOCUMENTS

| | | | |
|---|---|---|---|
| 0 394 171 A2 | 10/1990 | European Pat. Off. | .......... G06F 7/52 |
| 0 464 601 A2 | 1/1992 | European Pat. Off. | .......... G06F 7/48 |
| 0486143A2 | 5/1992 | European Pat. Off. | .......... G06F 7/48 |

*Primary Examiner*—Jose L. Couso
*Assistant Examiner*—Anh Hong Do
*Attorney, Agent, or Firm*—Wolf, Greenfield & Sacks, P.C.

[57] ABSTRACT

A method of processing a digital signal wherein multiple signal values are simultaneously operated upon in a single register. The register is not segmented in hardware, but is segmented by operation of a controlling computer software program. The controlling computer software arranges the digital signal in a computer memory in such a manner as to permit the register to be loaded with a plurality of digital samples, each having a precision less than the total precision available in the register. The method may include steps to partially compensate for errors introduced by carries from one segment of the register to another segment of the register, when necessary.

14 Claims, 12 Drawing Sheets

PARALLEL PROCESSING OF DIGITAL SIGNALS IN A SINGLE ARITHMETIC/LOGIC UNIT

FIELD OF THE INVENTION

The present invention relates generally to the field of digital signal processing systems, in particular signal processing systems implemented in software executing on a digital computer system. More specifically, the invention relates to aspects of digital signal processing wherein identical operations must be repetitively performed on different parts of a digital signal, and wherein those operations are substantially independent of each other.

BACKGROUND OF THE INVENTION

Although the invention has general applicability to the field of signal processing, it is of particular interest in various aspects of image signal processing.

In the context of the present invention, an image is a physical two-dimensional visual representation, wherein each point within the image may have associated therewith one or more physical characteristics. For example, in a monochrome image, each point may have associated therewith a luminance value. In a color image, each point may have associated therewith a red intensity, a blue intensity and a green intensity. Common image presentation technologies include printed photographic still images, movie images, television images, and computer images. Computer technology has now begun to open whole new areas of image presentation, such as high realism video games, electronic books, and others yet to reach commercialization. These latter forms of image presentation all use digital image signals as the physical representation of an image most suitable for communicating, processing and storing.

According to one convention, digital image signals are formed by first sampling a two-dimensional image on a grid. See, for example, FIG. 1a. Each sample, called a picture element, or pixel 101, in the grid has associated therewith a number of visual characteristics, such as brightness and color. These characteristics are converted into numeric form. Each characteristic of a pixel may have associated therewith a number. The digital image signal is then formed by assembling into a sequence electronic or other signals representative of the numbers corresponding to the physical characteristics associated with each pixel in the image. This sequence can be interpreted by a receiver of the digital image signal and used to reconstruct or otherwise process the image. One conventional sequence takes the pixels in their physical order along each row 103 of the image from left to right, proceeding from top to bottom as each row is inserted in the sequence. Other sequences are possible, including for example, taking pixels in their physical order from top to bottom along each column 104, proceeding from left to right as each column is inserted in the sequence.

One reason that emerging image-based technologies have not appeared sooner is that uncompressed digital image signals contain vast amounts of information, requiring vast quantities of storage space. Furthermore, moving uncompressed digital image signals from one user to another requires a large communication bandwidth to accommodate the large amount of information in a reasonable period of time. The old saw that a picture is worth a thousand words woefully underestimates the problem. Suppose that for a monochromatic (e.g., black and white) image 256 shades of gray are sufficient to represent a uniform luminance scale ranging from black to white. Each pixel occupies eight bits (binary digits) of storage. Thus an image created for display on a typical personal computer screen having a resolution of 640×480 pixels occupies a total of 307,200 bytes. That is the storage equivalent of approximately 100 pages of single-spaced text.

In view of the tremendous pressure that the use of images places on storage requirements, there has been a great deal of research into image compression techniques. A standard known as ISO 10918-1 JPEG Draft International Standard/CCITT Recommendation T.81 has emerged as a result of this research. The standard is reproduced in Pennebaker and Mitchell, "JPEG: Still Image Data Compression Standard," New York, Van Nostrand Reinhold, 1993, incorporated herein by reference. One compression technique defined in the JPEG standard, as well as other emerging compression standards, is Discrete Cosine Transform (DCT) coding. Images compressed using DCT coding are decompressed using an inverse transform known as the inverse DCT (IDCT). An excellent general reference on DCTs is Rao and Yip, "Discrete Cosine Transform," New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images, known as frames, for each second of displayed motion pictures. Therefore, motion picture compression techniques have been the subject of yet further development and standardization activity. Two important standards are ISO 11172 MPEG International Standard and CCITT Recommendation H.261. Both of these standards rely in part on DCT coding and IDCT decoding. The CCITT Recommendation H.261 further employs a finite impulse response (FIR) filter having small unsigned coefficients in a motion-compensated predictor, and MPEG requires a bi-linear interpolation step.

The digital image processing called for by compliance with the above-described standards includes many repetitive operations performed on different portions of the digital image signal. For example, in the CCITT Recommendation H.261, the digital image signal representative of one complete frame of video is subtracted from a digital image signal representative of an immediately subsequent frame of video on a point by point basis, so as to form a difference signal. This operation constitutes a repetitive operation, performed independently upon each pixel in the frame. Portions of the difference signal corresponding to blocks of image pixels, eight pixels on each side, are then processed by performing DCT coding, IDCT decoding and other digital signal processing operations. The difference signal is divided into a large number of these eight by eight pixel blocks, which are independent of each other, yet which undergo the same essential digital signal processing operations. Many other examples in the digital signal processing field, wherein different portions of a digital signal must undergo identical, independent processing operations are known, in the image processing area and other areas such as audio signal processing. In the image processing area, the different portions of the digital signal may be frames; sub-portions of frames, such as fields, lines or columns; groups of frames; or blocks (e.g., FIG. 1a, 105 and 107), depending on the particular processing performed.

In practicing digital signal processing on a single, conventional, central processing unit (CPU) in a personal computer (PC) which may contain one or more CPUs, or any single conventional arithmetic/logic unit (ALU) in a computer which may contain one or more ALUs, and particularly practicing digital image signal processing on such computers, each element of a digital image signal is conventionally operated upon sequentially with respect to each other element of a digital image signal. This sequentiality of operations greatly extends processing time in such systems. Since often the operations are independent of each other, i.e., the result of one operation does not affect the result of another operation, they can in principle be carried out in parallel. In multiple CPU or multiple ALU configurations, the units may act in parallel on different portions of a digital signal simultaneously, but each unit still operates sequentially on a series of elements, rather than in an internally parallel fashion.

Therefore, it is a goal of the present invention to reduce processing time of digital signals using a single conventional CPU or ALU in a computer, such as a PC, to perform signal processing operations in parallel on two or more different portions of a digital signal simultaneously.

SUMMARY OF THE INVENTION

The present invention achieves the above goals and such other goals as will be apparent to those skilled in the art by providing a method of processing digital image signals, including parallel processing of values in a general-purpose register. The method may include the following steps. An image or other physical signal is received and represented as a digital signal including a sequence of discrete digital signals representative of numerical values, also referred to as samples. For example, the digital signal may be a sequence of samples, represented by electrical signals in a digital computer, each electrical signal representative of a binary number. The sequence of samples is subdivided into pluralities of digital samples. A first plurality of samples from the sequence is loaded into adjacent segments or contiguous groups of bits in the register. After multiple samples have been loaded into adjacent segments in the register, an arithmetic/logic unit function (e.g. addition, subtraction, etc.) is performed, thus forming a plurality of new digital samples. The arithmetic/logic unit function may optionally require a second plurality of samples as a second operand.

Errors introduced by carries from one segment of the register to another may be compensated for. Depending on the choice of arithmetic/logic unit function and input signal characteristics, a statistically expected error resulting from a carry from an adjacent one of the plurality of new digital samples may be subtracted from one or more of the plurality of new digital samples when the statistically expected error is non-zero. Alternatively, guard bands may be provided between segments, the guard bands being cleared periodically or at another time prior to affecting an adjacent segment.

BRIEF DESCRIPTION OF THE DRAWINGS

Embodiments of the present invention will now be discussed in connection with the figures. Like reference numerals indicate like elements in the figures, in which:

FIG. 4b is a map of one segmentation of the register shown in the signal flow graph FIG. 4a;

DETAILED DESCRIPTION

The present invention will be better understood in view of the following description, read in connection with the figures.

Figure 2:
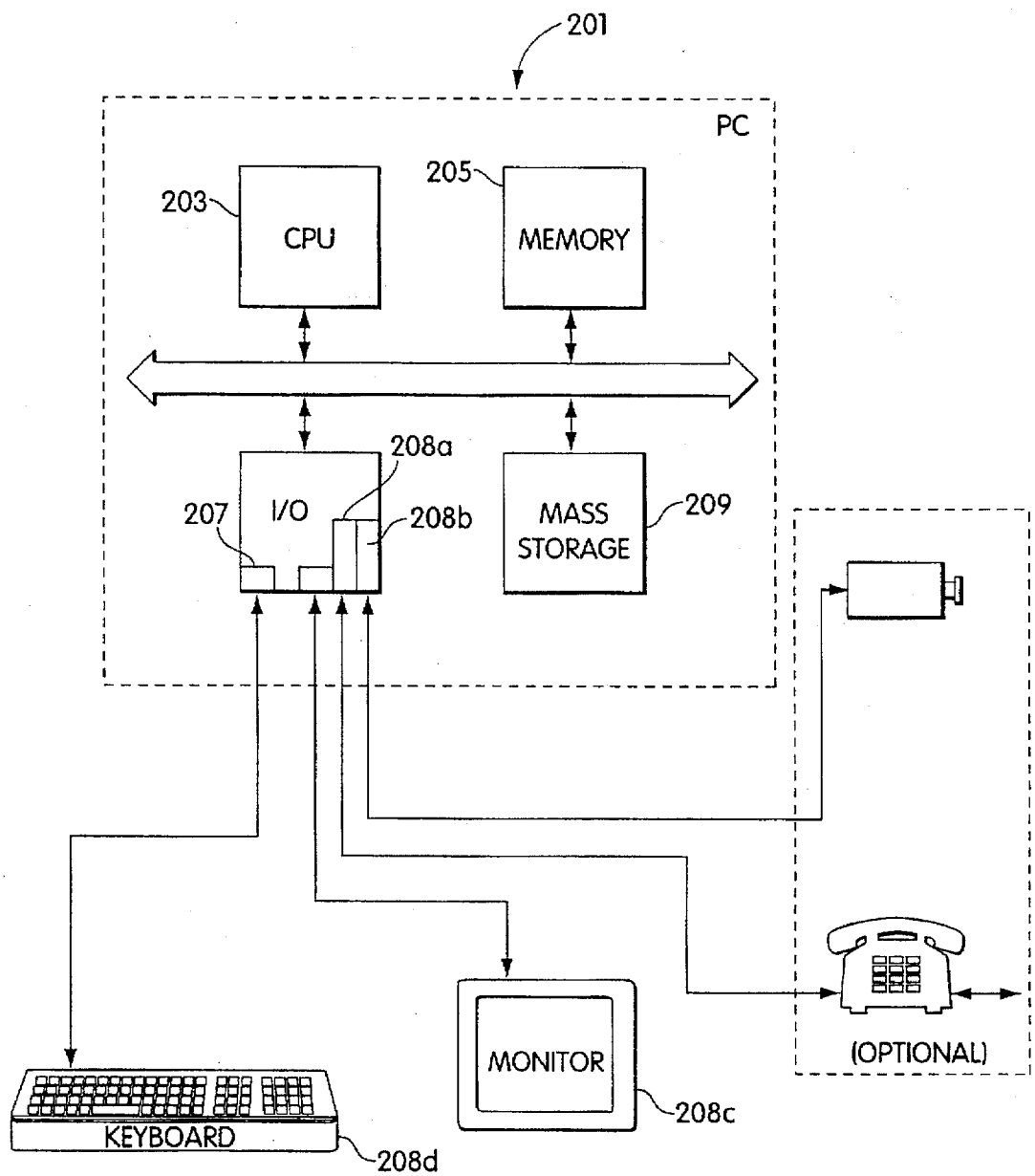
FIG. 2 is a block diagram of a computer system suitable for practicing the present invention.

The embodiments and variations disclosed herein are all intended to be implemented in the form of software running on a personal computer (PC), configured substantially as shown in FIG. 2. However, the specific hardware configuration is not a limitation of the present invention. Indeed, the invention could be embodied in software running on other types of general-purpose computers, or embodied in special-purpose integrated circuits. However, the PC configuration of FIG. 2 illustrates the general hardware parameters suitable for practicing the invention, without unduly complicating the detailed explanation thereof.

Referring to FIG. 2, the PC 201 includes a central processing unit (CPU) 203, memory 205, input/output (I/O) system 207 and mass storage 209. These are now briefly discussed, before turning to the software of the present invention.

The CPU 203 should preferably be of a type having an internal precision and register size of at least thirty-two bits, such as the Intel 486 family or Motorola 68040 devices. Alternatively, the CPU 203 can be a 64-bit precision device, such as a Digital Equipment Corp. Alpha processor or a MIPS R4000 processor. Clearly, these modern processors have internal precisions which substantially exceed the eight to sixteen bit precision typically needed to process digital image signals. The minimum processing speed is not a critical parameter, but may be chosen by the skilled designer. Naturally, differences in processing speed will have a direct effect on the performance of different systems.

Having sufficient quantities of memory 205 available in the PC 201 will also have a direct effect on system performance. The PC 201 preferably includes several megabytes (M bytes) of RAM, as well as other forms of memory, such as operating system ROM, which is not important to this description. (1M bytes=1,048,576 bytes.) However, the specific quantity or type of memory is not a limitation of the invention.

Data and digital signals of various kinds may be passed into or out of PC 201 through I/O system 207. An extremely wide variety of devices may be included in I/O system 207. The devices of I/O system 207 allow digital image signals to be received into or transmitted out of PC 201. For example, I/O system 207 may include a modem 208a for sending digital signals or receiving digital signals or data from remote devices and computers. Such digital signals could include digital image signals. Another possible I/O device is a frame grabber 208b, which could be used to introduce into PC 201 television or video images which have been converted to digital form. Of course, I/O system 207 may include such conventional I/O devices as a monitor 208c, keyboard 208d and printer (not shown), which may be desirable.

Programs, data and digital signals which need to be stored on a more permanent basis than permitted by the RAM portion of memory 205 are stored in a mass storage device 209. The mass storage device 209 may be a hard disk, an optical disk, a CD-ROM or any permanent storage device having similar characteristics to the devices mentioned.

Image signals of either analog or digital form are received into the PC 201 through one of the devices of I/O system 207. Once inside the PC 201, the image signals will have been converted to digital form if originally in analog form. That is, they are digital image signals comprised of sequences of discrete digital signals known as samples, as described above. In order to facilitate the following description, it is presumed that the digital image signals are undergoing signal processing prior to either storage in a mass storage device 209 or transmitted to another location via one of the I/O devices of the I/O system 207. However, the invention may be practiced in other contexts, as will be apparent to those skilled in the art. Subsequently the digital image signals may be used to operate a display device, for example the monitor 208c, to display the image in its customary form. One example of this is where the PC 201 is part of a conferencing network where images are to be exchanged, stored and displayed on a plurality of such machines. The methods and apparatus next described relate primarily to a portion of the conversion of the digital image signal into a compressed signal suitable for storage or transmission and reconversion of the compressed signal back to a digital image signal suitable for operating a display device.

Figure 3:
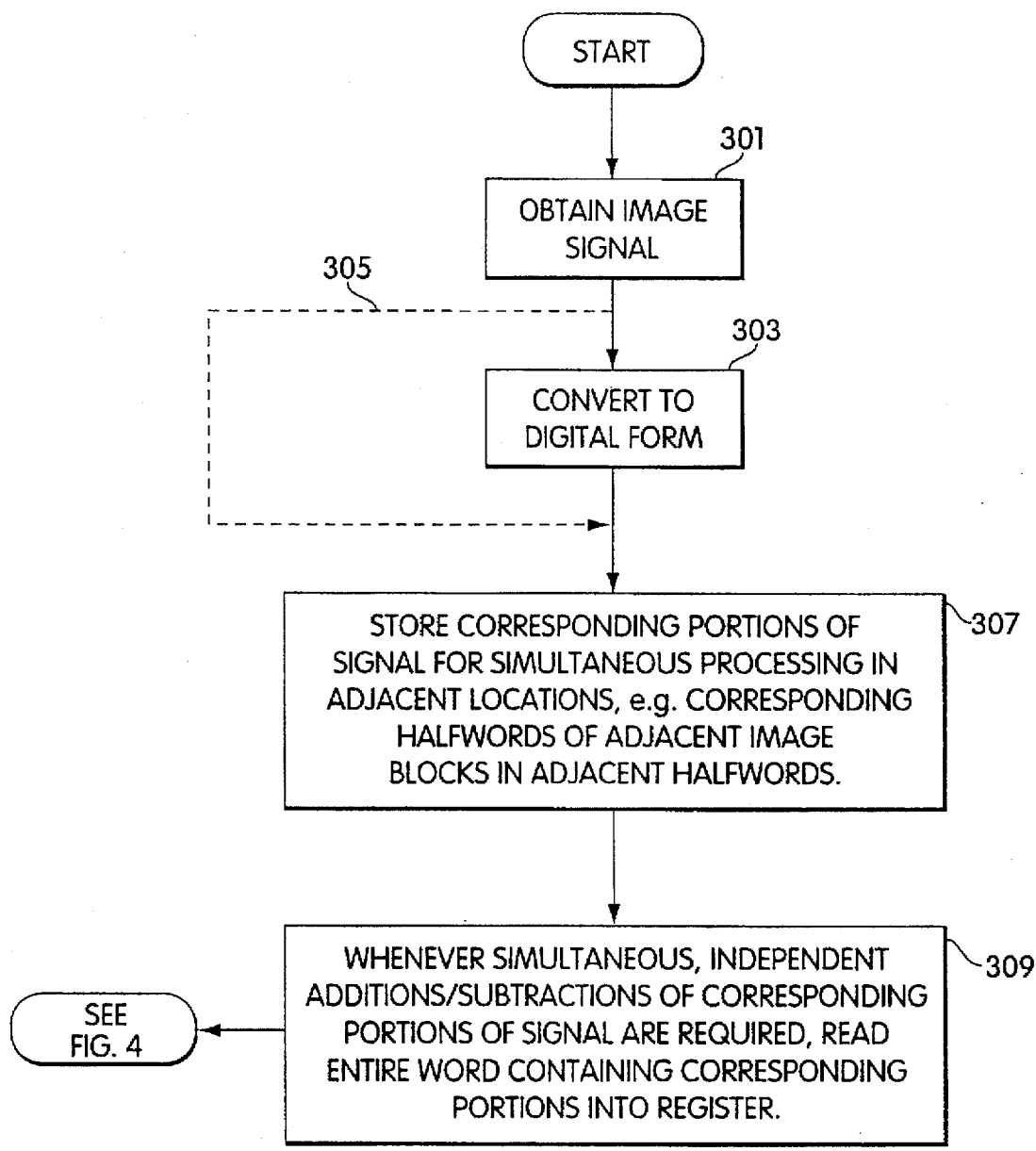
FIG. 3 is a flow-chart of one aspect of the method of the present invention.

A first aspect of the present invention is now described in connection with the flow chart of FIG. 3. According to this aspect of the present invention, digital image signals are pre-processed or arranged in such a manner as to permit further processing in accordance with other aspects of the present invention.

The first step of a method, according to the present invention, is to obtain an image signal (Step 301), which is then converted to digital form (Step 303), if necessary. As discussed above, in connection with FIG. 2, the digital image signal may be obtained by the PC 201 through any one of a variety of elements of the I/O system 207. If the image signal obtained in Step 301 was originally created in digital form, then the step of converting the image signal to digital form (Step 303) may be omitted, as shown by the phantom arrow 305.

The obtained digital image signal may then be temporarily stored in memory (FIG. 2, 205), pending further processing. In accordance with this aspect of the present invention, portions of the digital image signal having a defined correspondence to each other are stored in adjacent locations (Step 307).

As a first example, consider an application of the present invention to the differencing step frequently performed when processing digital image signals representative of motion pictures. In this case, the defined correspondence may simply be identically located pixels within the physical image which are in successive frames of the motion picture. Since identically located pixels are to undergo identical processing as described below, they are stored in adjacent memory locations. As a second example, consider the image represented in FIG. 1. As noted above, the image is composed of a series of rows 103 of individual pixels 101, each of which contains one or more discrete digital signals or samples representative of numerical values corresponding to physical characteristics of the image at discrete physical locations within the image. The digital image signal representative of this image is typically the sequence of pixels 101 in the order in which they are physically presented in each row 103 from left to right, and with rows 103 arranged in order from the top of the image to the bottom of the image. However, for certain types of image processing, it is desirable to associate blocks of pixels which occupy a square region of the physical image, such as block 105, as portions of the image to be processed together. That is, for an 8×8 block 105, the 64 pixels in block 105 would be processed together. Conventionally, adjacent block 107, would undergo similar processing, but at a subsequent point in time.

Figure 1A:
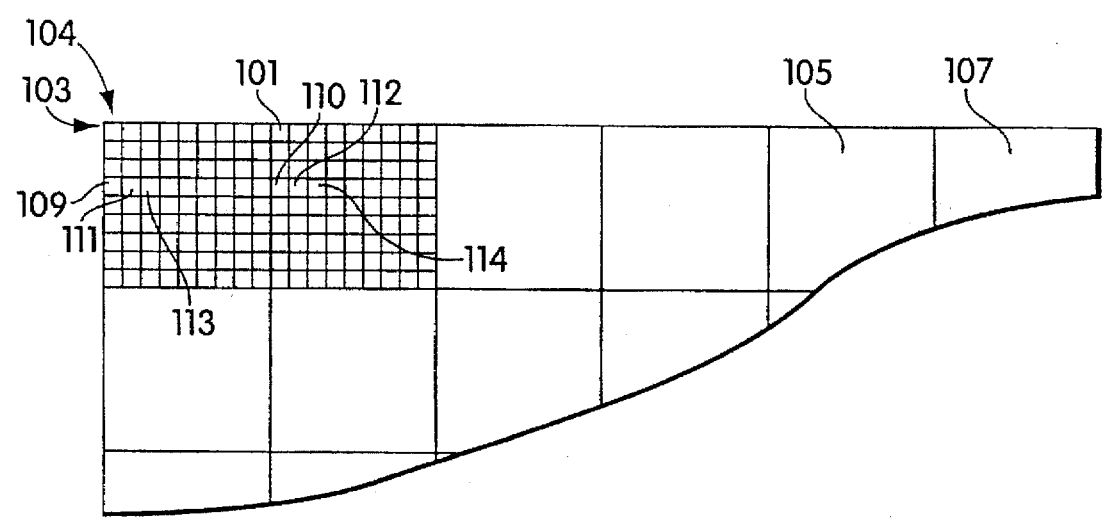
FIG. 1a is a representation of the division of an image into pixels.
Figure 1B:
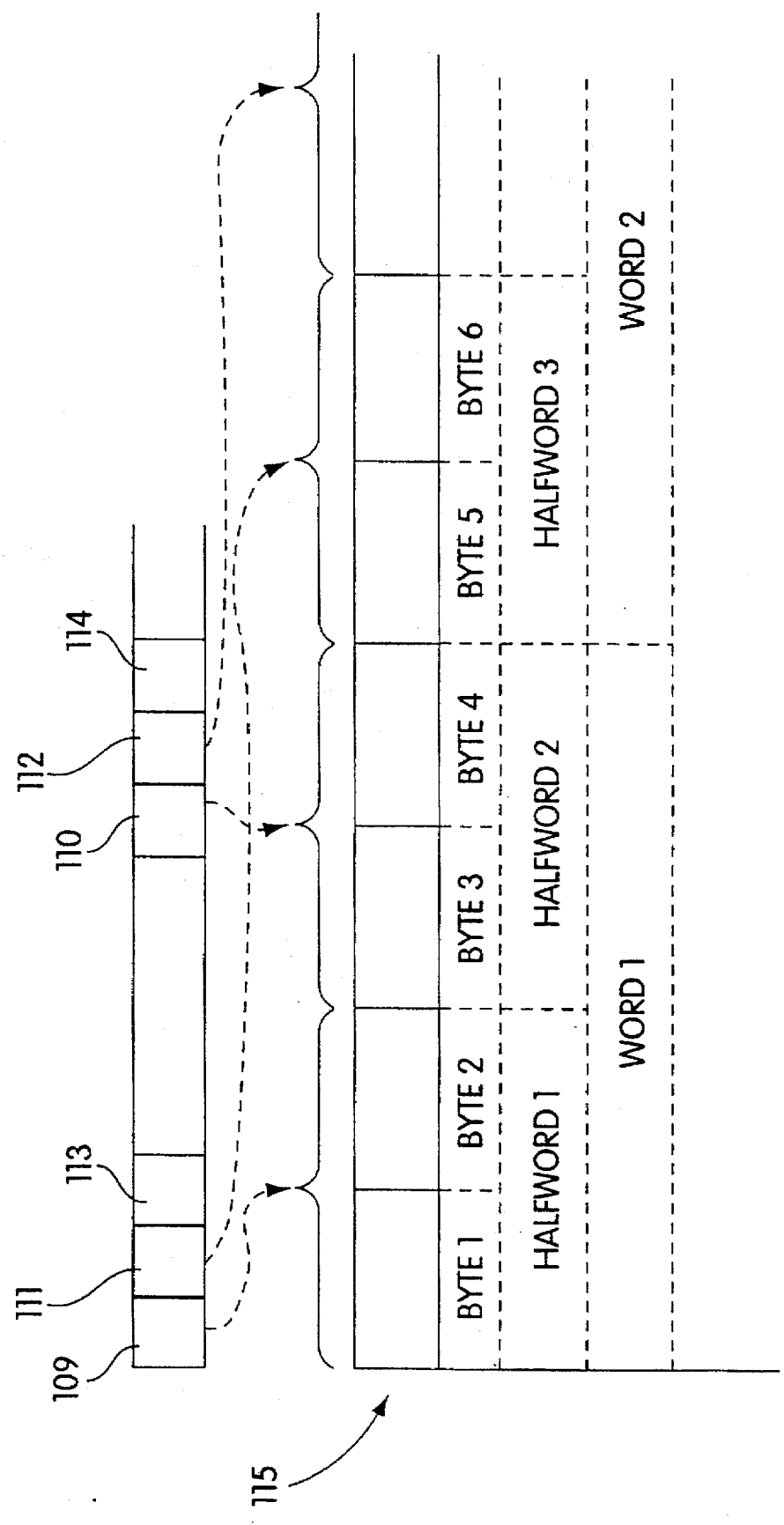
FIG. 1b is a representation of a possible storage configuration of the pixels of FIG. 1a in a computer memory.
Figure 4A:
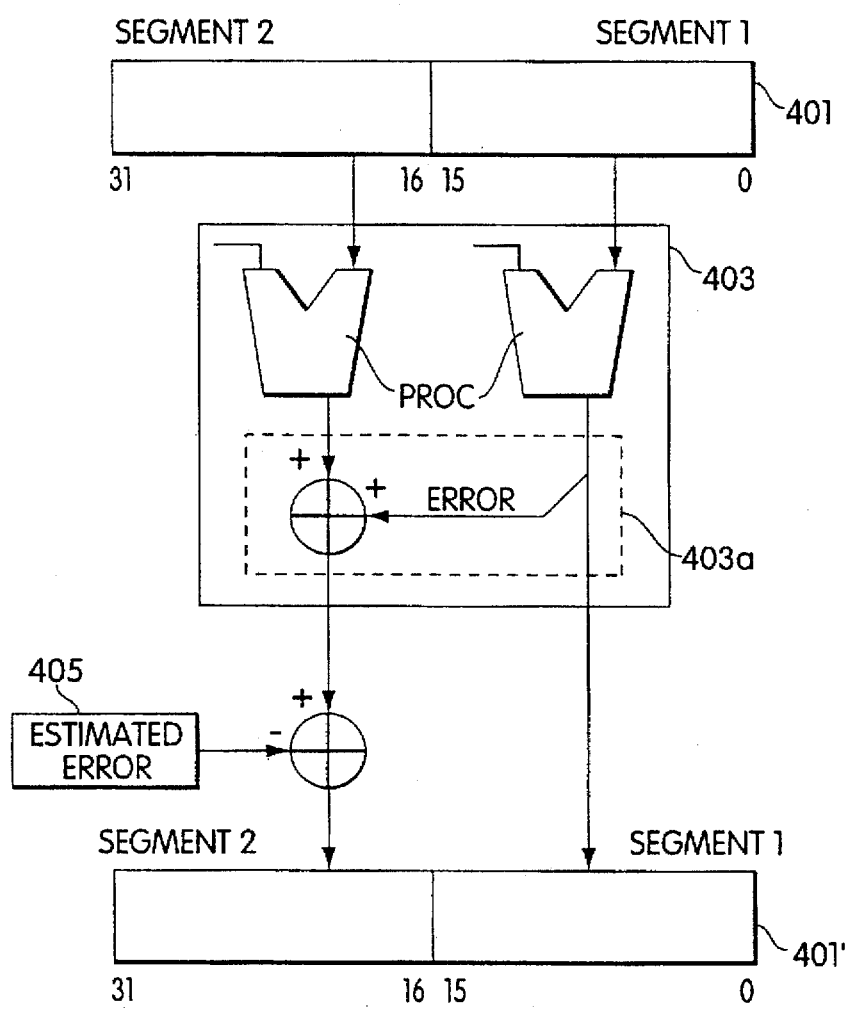
FIG. 4a is a signal flow-graph of another aspect of the present invention.

In accordance with the present invention, it is desirable to arrange pixels of block 105 adjacent to corresponding pixels of block 107. That is, the discrete digital signals or samples comprising the block 105 may be treated as a separate digital image signal for storage and processing purposes. Likewise, the discrete digital signals or samples comprising the block 107 may be treated separately. As these adjacent blocks 105 and 107 are stored in memory, the samples representative of pixels at corresponding locations with the blocks 105 and 107 are stored in adjacent locations in memory. Notice that this arrangement causes the samples representing the image pixels 101, and comprising the digital image signal, to be stored in memory in an interleaved order. That is, although the pixels of block 105 and corresponding pixels of block 107 are not sequential within the conventional digital image signal which is arranged as continuous rows 103, they will be stored in adjacent locations, with all the pixels of those two blocks located within memory in close proximity to each other. An example of corresponding pixels in adjacent blocks of an image is illustrated in FIGS. 1a and 1b. Pixel 109 corresponds with pixel 110; pixel 111 corresponds with pixel 112; and pixel 113 corresponds with pixel 114. For purposes of simplification of this description, it is assumed that each pixel is represented by a sample whose representation in a computer may be understood as a numerical value in two's-complement form and occupying 16 bits or less. Thus, in accordance with this aspect of the present invention, pixel 109 will be stored in BYTE1 and BYTE2 of memory 115, corresponding to HALFWORD1 of memory 115. Likewise, corresponding pixel 110 will be stored in BYTE3 and BYTE4 of memory 115, corresponding to HALFWORD2 of memory 115. Therefore, as will be seen below, in connection with FIG. 4, a CPU or ALU reading WORD1 from memory 115 loads both pixel 109 and 110 into a register. Since operations performed on corresponding pixels of blocks 105 and 107 are independent of each other but performed in identical sequence, they may now be performed simultaneously, as next described in connection with FIG. 4a.

Samples representative of corresponding pixels in adjacent blocks (e.g., FIG. 1a, blocks 105 and 107) are loaded into segment 1 and segment 2 of a register 401. Segment 1 and segment 2 are merely convenient notation for indicating that the described embodiment treats the upper halfword and the lower halfword of the register as separate samples. However, the segments are part of one, undivided register 401. Depending on the choice of hardware on which the invention is practiced, this may be greatly facilitated by certain parameters. For example, assume the CPU 203 has a 32-bit register set. If the samples representative of corresponding pixels in adjacent blocks are stored as adjacent 16-bit halfwords, as described above, then they may be simply and simultaneously loaded into a register 401 by reading one 32-bit word. Other choices of register size and number of segments simultaneously processed may be made, as will be evident to those skilled in the art. Furthermore, although this explanation is given using two's-complement values for all discrete digital signals, other representations will work. For example, a register that uses a sign-magnitude representation will work. Recovering the simultaneous result in two's-complement form requires the addition of 1000 . . . $0_2$ to yield a positive register content and masking off the most significant magnitude bit in the register.

The processing of the lower order segment, segment 1, is straight forward. If a value is to be added to segment 1, the addition process is performed 403, leaving a result in segment 1 of the register 401'. However, when segment 2 is simultaneously processed 403, the processing of segment 1 may result in a carry into the low order bits of segment 2, introducing an error 403a. Generally, the magnitude of the error introduced 403a, if any, is not a priori known. However, statistical methods may be used to estimate the expected error which may then be used to approximately compensate for the error introduced 403a. Since the compensation is only an estimate, the compensation performed is imperfect.

First, the probability density function for introducing a carry from segment 1 to segment 2 is computed. This is simply the probability for each possible value loaded into segment 1 of a number being added thereto resulting in a carry into segment 2. In the example illustration, segment 1 is 16 bits wide. Note that sign extension of the value in segment 1 is treated here as a carry.

The probability density function computed is then used to compute an expected value of the error due to carries. The expected value is simply the mean error computed for all possible combinations of values which may be added in segment 1. The expected value is used as estimated error 405. As an alternative, the estimated error 405 is the mean error introduced into segment 2, computed for representative sets of values to be added in segment 1. Estimated error 405 is then subtracted from the summation, which has been performed on segment 2, to produce a compensated result in segment 2 of the register 401'. It should be noted that the estimated error 405 may be either positive or negative, so that the subtraction may increase or decrease the result in segment 2 of the register 401'.

Figure 5:
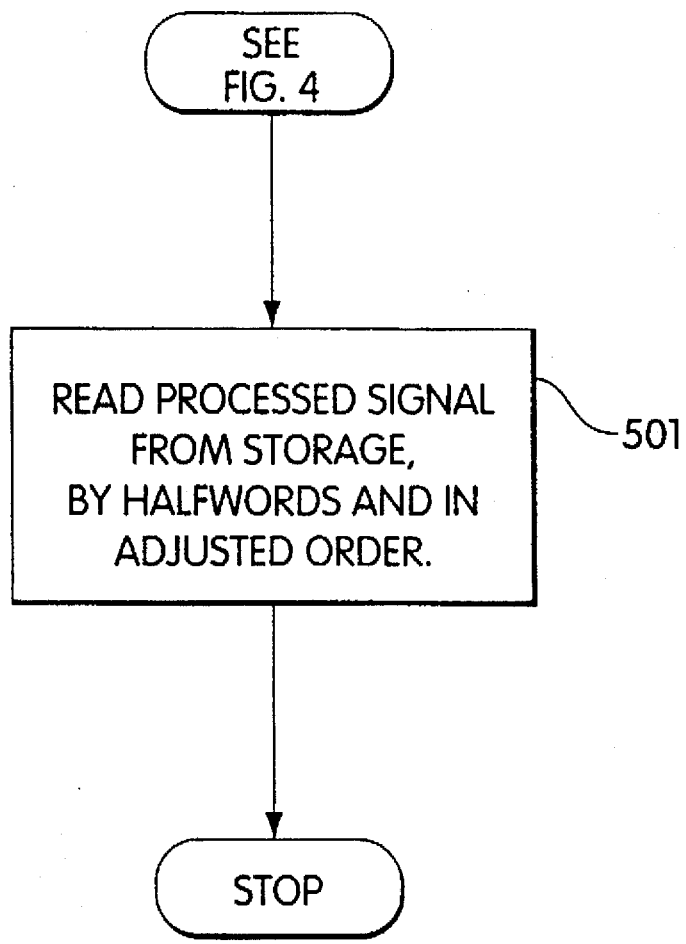
FIG. 5 is a flow-chart of yet another aspect of the present invention.

The results of summations thus performed may then be returned to memory (FIG. 2, 205) in the order in which they were performed, or they may be returned to memory in an order adjusted to result in an output signal arranged in natural order for reading back out of memory (FIG. 5, step 501).

It should be readily apparent that performing the frame difference operation mentioned above is similarly simplified by the present invention. The proper arrangement of the digital image signal in memory placed corresponding pixels of the frames to be subtracted adjacent in memory. The steps of accumulating and compensating for errors are as described above.

An alternate method of at least partially compensating for errors introduced by carries from one segment of an accumulator used in accordance with the present invention to another segment of the register is now described in connection with FIG. 4b.

Figure 4B:
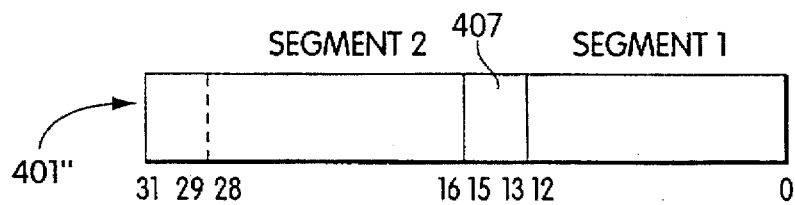

As shown in FIG. 4b, the segments of register 401" in accordance with this embodiment of the invention are separated from each other by one or more unused bits, referred to as a guard band 407. This arrangement is useful where the required precision of the individual values to be processed is less than the space available in the register for them. When this arrangement is used in the system of FIG. 4a, an estimated error 405 need not be subtracted from upper segments, such as segment 2. Instead, errors are allowed to accumulate in guard band 407 for a predetermined number of operations or until detected by a test of guard band 407. After the predetermined number of operations, or alternatively after testing guard band 407 for the presence of error bits and finding error bits, guard band 407 is reset to all zero values. Thus, the errors never propagate from one segment to an adjacent segment.

Numerous other arrangements of segments and guard bands will now be evident to those skilled in the art, which would accomplish the same result as described above. For example, the various sizes and number of segments may be varied without departing from the spirit of the present invention.

The present invention, as described above, has general signal processing applicability. However, the invention is now described in the context of four distinct applications thereof in the field of digital image signal processing. The invention will now be described in connection with performing the DCT, performing the IDCT, performing FIR filtering using low-precision unsigned coefficients and performing video noise reduction.

Figure 6:
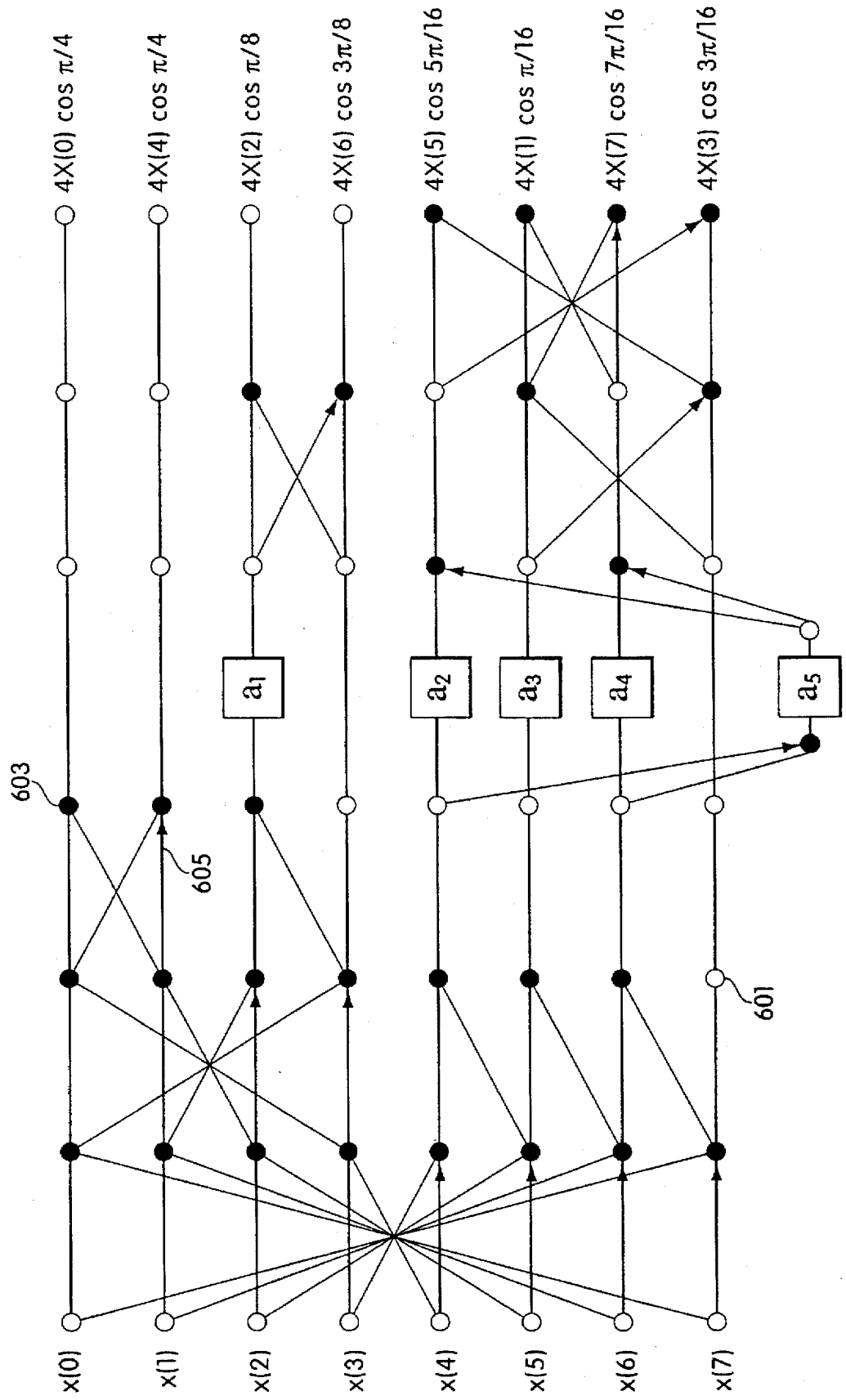
FIG. 6 is a data flow graph of a conventional fast DCT.

FIG. 6 is a flow graph of a fast, eight-point DCT adapted from that shown in Pennebaker et al., p. 52. In the flow graph of FIG. 6, open circles, e.g., 601, represent buffering of the previous value in the graph, without performing an operation on the value. Filled circles, e.g., 603, represent summations. Where a line entering a circle includes an arrowhead, e.g., 605, the value is negated before entering the circle. Values in boxes $a_1$, $a_2$, $a_3$, $a_4$ and $a_5$ are constants by which the value entering the box is multiplied, before exiting the box. The DCT of FIG. 6 may be implemented as three stages, as shown in FIG. 7.

Figure 7:
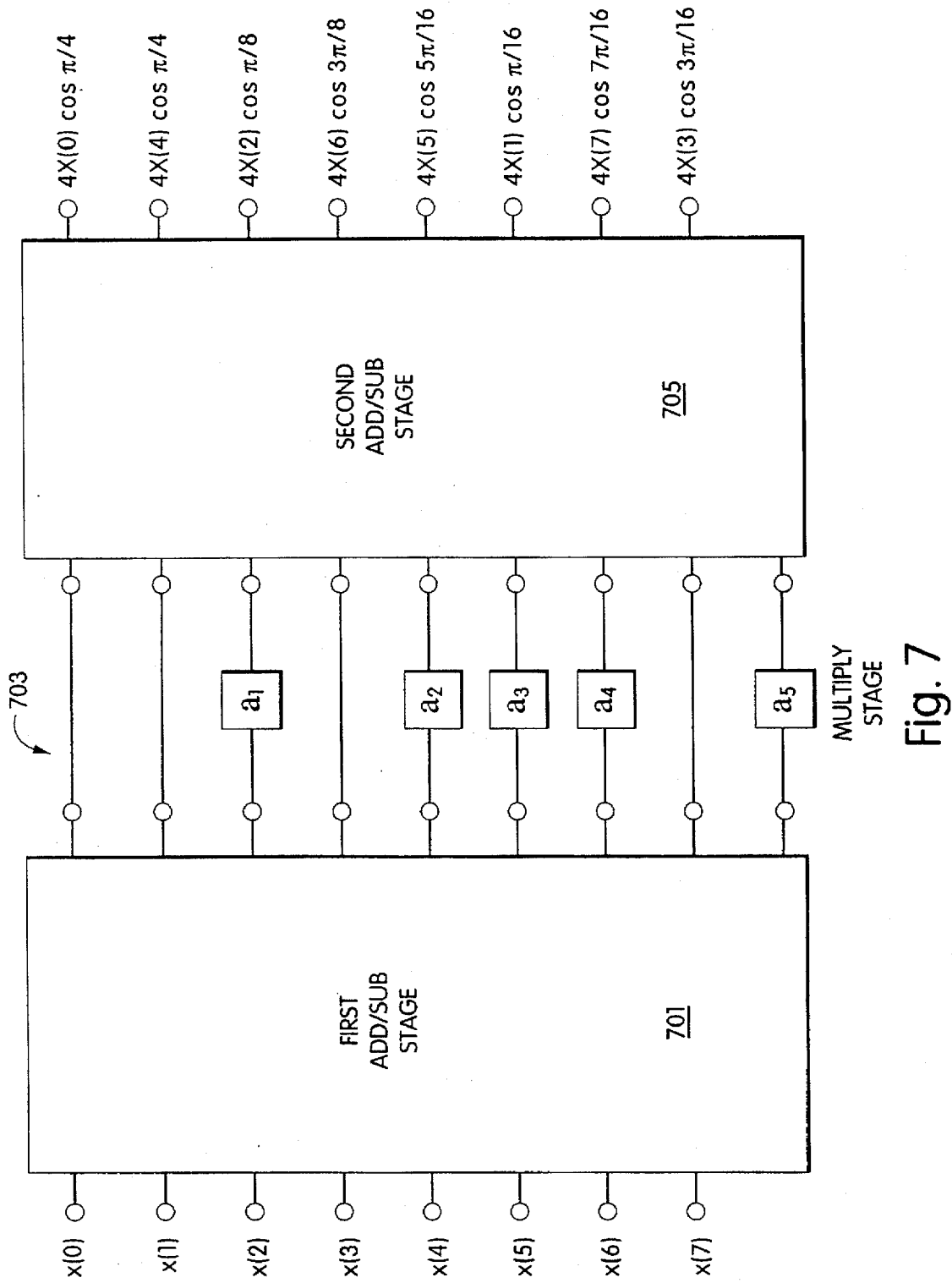
FIG. 7 is a block diagram of the process illustrated in the data flow graph of FIG. 6.

The stages of FIG. 7 include a first addition/subtraction stage 701, a multiply stage 703 and a second addition/subtraction stage 705. It should be clear to those skilled in the art from the above description, that the first and second addition/subtraction stages 701 and 705 may be implemented in accordance with the first aspect of the present invention. That is, the digital signals arriving for processing may be ordered so that corresponding elements of two different vectors of eight signal values, e.g., X(0) of a first vector and X(0) of a second vector, are temporarily stored in adjacent half words, so that they may be readily loaded into segment 1 and segment 2 of an accumulator register (FIG. 4, 401). The additions and subtractions are performed as described above in connection with FIGS. 3, 4 and 5.

An IDCT has been described in co-pending application, Ser. No. 08/125,590, filed Sep. 23, 1993. The IDCT described therein computes intermediate values which are grouped according to four different symmetry classes. In a final stage, two butterfly operations are performed between pairs of symmetry classes. Since the butterfly operations comprise only addition and subtraction operations, they may be performed using the method of this invention as described above in connection with FIGS. 3, 4 and 5.

In the case of these two butterfly operations, the inputs to the butterfly operations may be paired and loaded into an accumulator register (FIG. 4, 401) and processed simultaneously, rather than serially, as would ordinarily be done. The arrangement of the input signal in this case is particularly suitable for simultaneously processing two or more columns.

The H.261 video coding standard specifies a 2-D low-pass filter that is selectively applied to eight-by-eight blocks of the motion-compensated previous image. The filter is separable into a horizontal filter and a vertical filter. In each dimension, the filter coefficients are (1/4, 1/2, 1/4). At the edges, where one tap would fall outside the block, there is no filtering, i.e., the coefficients are (0, 1, 0).

Figure 8B:
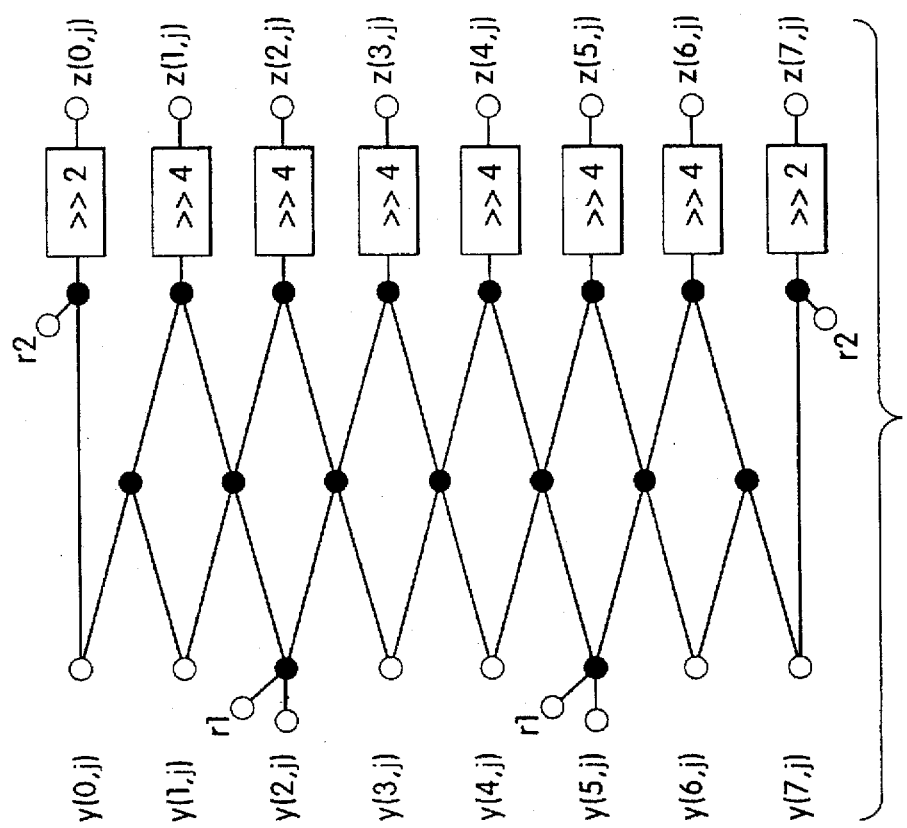
FIGS. 8a and 8b are data flow graphs of conventional FIR filtering processes.
Figure 8A:
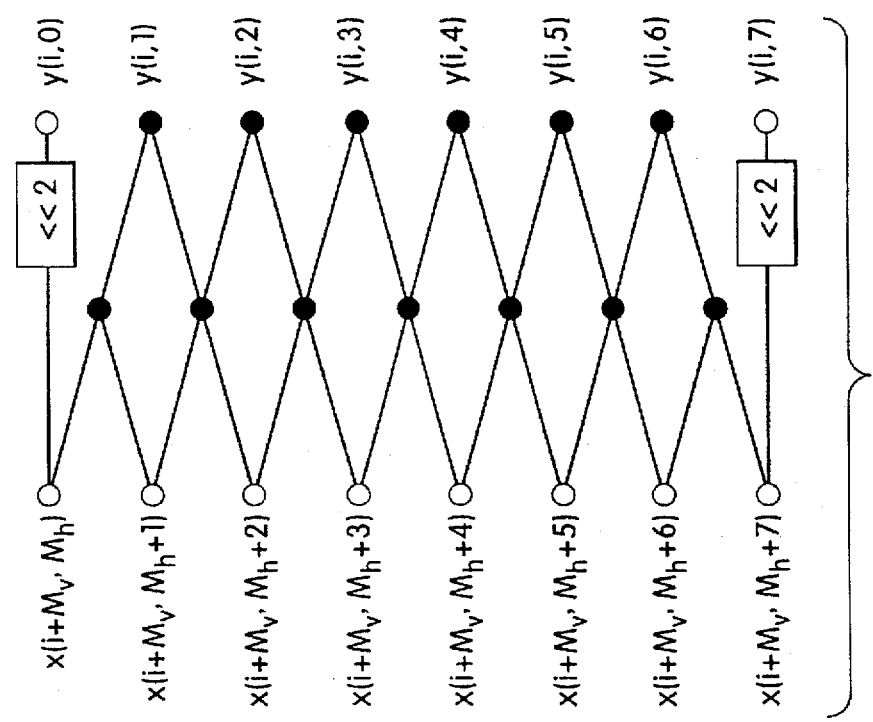

FIG. 8a shows the first stage of filtering, e.g., in the horizontal dimension. The input to the filter is a vector of discrete digital signals representative of motion-compensated previous frame pixel values: $[x(i+M_v, M_h) x(i+M_v, M_h+1) \ldots x(i+M_v, M_h+7)]$, where $M_v$ and $M_h$ are the vertical and horizontal components of a motion vector indicative of the translation of the block from the previous frame. The vector is part of a horizontal row from the two-dimensional image plane. The output vector $[y(i,0) y(i,1) \ldots y(i,7)]$ contains two fractional bits. The second filtering stage receives as an input a vector $[y(0,j) y(1,j) \ldots y(7,j)]$ which is part of a vertical column from the two-dimensional image plane. In the second filtering stage, rounding is accomplished by adding 0.5 (r1 and r2) before truncating the fractional bits. The output of the second stage is the vector $[z(0,j) z(1,j) \ldots z(7,j)]$. See FIG. 8b.

The operations outlined in FIG. 8 can be performed on multiple blocks simultaneously. If the lower halfword (bits 0–15) holds values for one block and the upper halfword (bits 16–31) holds values for a second block, all operations for two blocks may be performed simultaneously. The operations are to be performed according to the methods described in connection with FIGS. 4a and 4b. The input data is eight bits, unsigned. The additions make the data expand to twelve bits. After rounding, the results are obtained in bits 0–7 and bits 16–23, respectively.

It should be clear from the description that any quantity, L, of blocks may be processed simultaneously in an ALU that has a word length of at least 12L bits. Many variations are possible. One preferable embodiment, practiced on a standard microprocessor, includes performing the filtering in the first dimension for one row of selected 8×8 blocks at a time. The output from the first filter stage is then ordered so that the filtering in the second stage can be performed on multiple columns of the selected 8×8 blocks at a time using the technique described here.

Notice that writing the contents of the accumulator register (FIG. 4a, 401) to memory as one 32-bit word puts values into every other byte. On a subsequent pass, bytes may be interleaved between those previously written.

Yet another application embodying the present invention is now described in connection with digital video noise reduction. One type of video noise reduction system is shown in the block diagram of FIG. 9.

Figure 9:
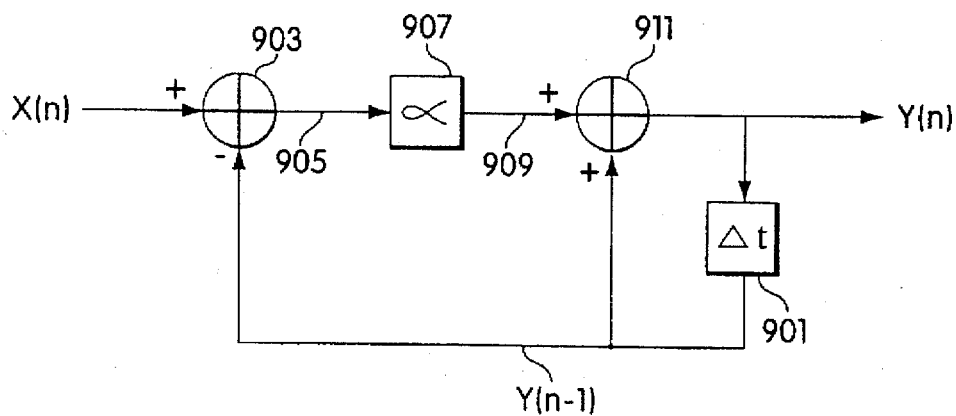
FIG. 9 is a block diagram of a conventional video noise reduction system.
Figure 10:
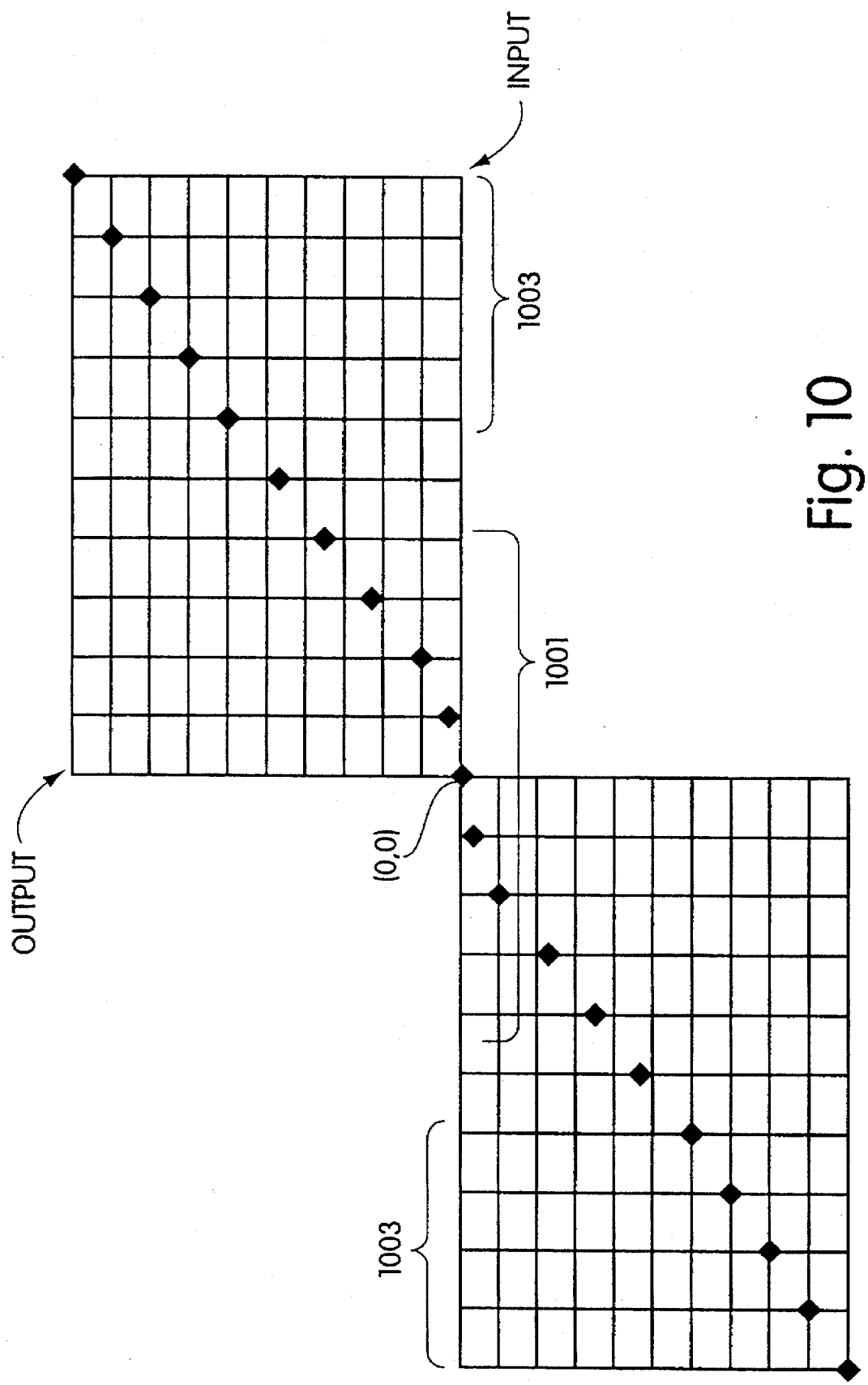
FIG. 10 is a graph of a non-linear transfer function for attenuation factor $\alpha$.

The block diagram of FIG. 9 illustrates a recursive temporal video noise reduction filter. The system operates on each input pixel of a frame X(n) to produce a corresponding pixel in an output frame Y(n), where n denotes the number of the current frame. This filter is recursive in the sense that a portion of the output Y(n) is fed back and combined with the input X(n). In the filter illustrated, each output pixel Y(n) is delayed by one frame time 901 to produce the delayed output signal Y(n−1). A difference 903 is taken between the input pixel X(n) and the delayed output pixel Y(n−1) to produce a difference signal 905. The difference signal 905 is then attenuated by multiplication by the attenuation factor α 907. Finally, the attenuated difference signal 909 is added 911 to the delayed output Y(n−1) to produce the new output pixel Y(n). The attenuation factor α may be constant, but a constant attenuation factor causes a distortion known as motion blur in moving areas of the picture. Therefore, preferred embodiments of video noise reduction systems vary the attenuation factor α as a function of the absolute value of difference signal 905. Generally speaking, it is assumed that if the absolute value of difference signal 905 is small, then the difference is likely to have been caused by noise and may therefore be substantially attenuated. However, if the absolute value of the difference signal 905 is large, then the value is probably a result of motion at that point in the picture, and therefore little or no attenuation is applied. FIG. 10 is a graph illustrating a typical non-linear filter characteristic. In FIG. 10, the input is the difference signal (FIG. 9, 905) and the output is the attenuated difference signal (FIG. 9, 909). The ratio of output to input value at any point is the attenuation factor α at that point. In this example characteristic, the attenuation factor α is substantially less than 1 for small input values 1001, but for large input values 1003 the attenuation factor α becomes equal to 1. The difference equation performed by the filter described is:

$$Y(n)=Y(n-1)+\alpha[X(n)-Y(n-1)].$$

Figure 11:
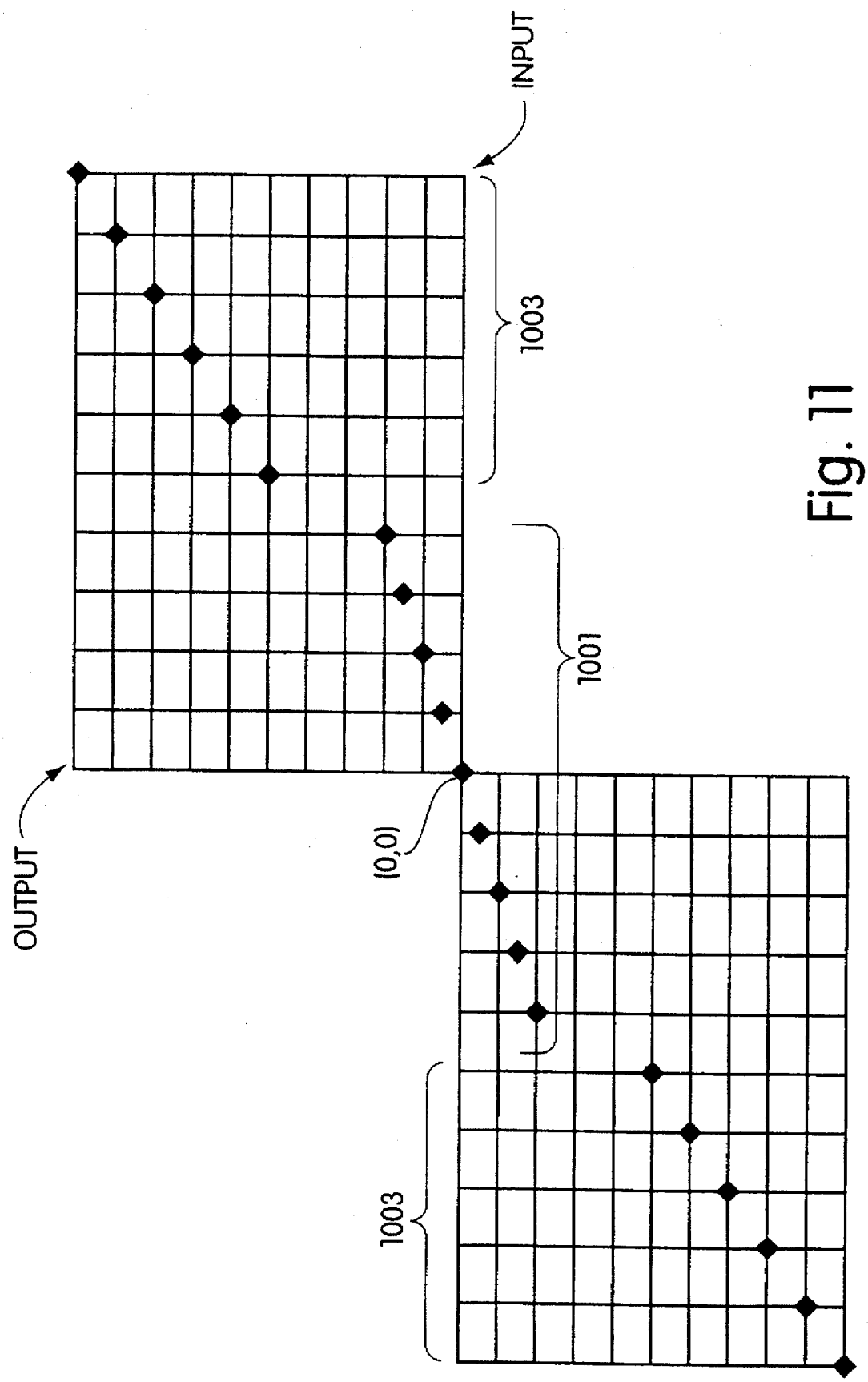
FIG. 11 is a graph of a piece-wise linear transfer function for attenuation factor $\alpha$.

The filter just described is quite computationally demanding, when implemented serially, as described above. The transfer function for the attenuation factor α is usually implemented using a look-up table. However, by using the present invention, multiple pixels will be processed in parallel, which is much less computationally demanding, but which renders a look-up table inconvenient. Therefore, the transfer function for attenuation factor α will be implemented as a piece-wise linear function, where the slope of each segment of the function is $2^{-m}$, where m is a positive integer or zero, and where the extension of each segment passes through the origin. FIG. 11 illustrates one such transfer function, where m is one for a linear segment running from input values of a negative intermediate to a positive intermediate value and where m is zero for a linear segment running from the value one greater than the positive intermediate value to 255 and another linear segment running from the value one less than the negative intermediate value to −255. By constructing a piece-wise linear approximation of the desired transfer function for the attenuation factor α, where the attenuation factor α is of the form $2^{-m}$ discussed above, the attenuation factor may be implemented as zero or more register shift operations, which may be performed conveniently in a parallel fashion on multiple pixels simultaneously. Performing the required shifts, additions, subtractions and logical functions on four 7-bit pixels in a single 32-bit ALU register producing 8-bit output pixels is now described as an example. As in previous examples, the choice of the number of bits representing various signals and the size of the register is a design choice left to one skilled in the art.

Figure 12:
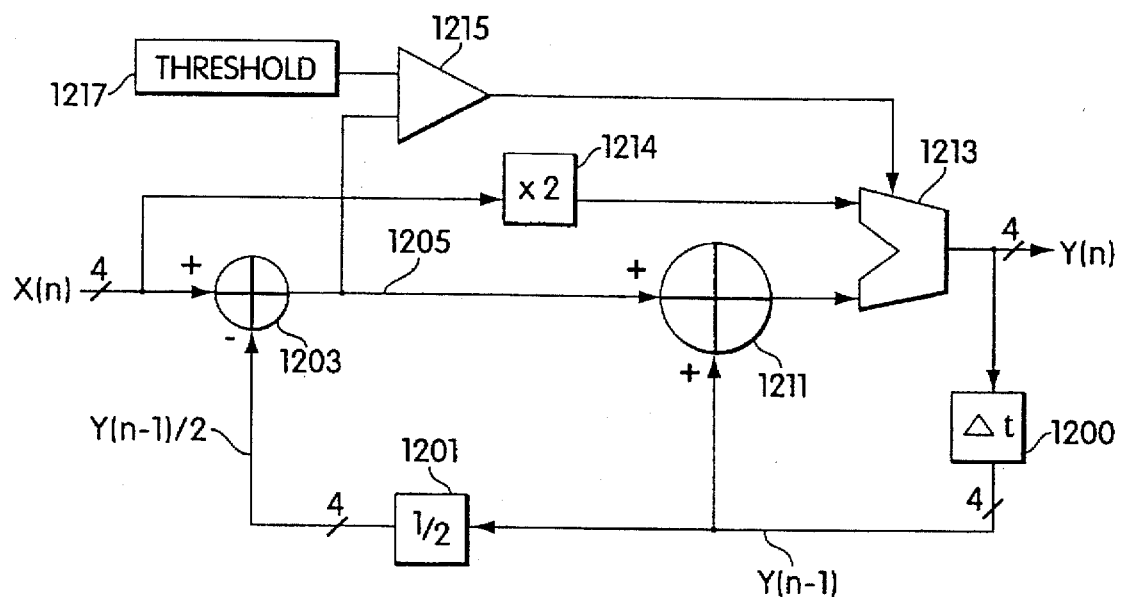
FIG. 12 is a block diagram of a video noise reduction system according to an aspect of the present invention.

The operation is generally represented as shown in the block diagram of FIG. 12. A comparison of the block diagram of FIG. 12 with that of FIG. 9 reveals some differences between the system of FIG. 12 and the system of FIG. 9, but the difference equation implemented in FIG. 12 is approximately the same as those implemented in FIG. 9, but is performed on vectors of pixels. The input to the system, X(n) is a vector of four pixels loaded into a 32-bit accumulator register, in the present embodiment. Likewise, the output vector Y(n) and the delayed output Y(n−1) are each 4-pixel vectors. The input pixels of the example system comprising the input vector X(n) are 7-bit unsigned pixels obtained from a digital video input signal source. The vector is arranged as four adjacent segments in the 32-bit register, each segment being one byte wide. This arrangement is similar to that described above, in connection with FIG. 4a, but employing four segments, rather than two. Each pixel occupies the seven least significant bits of each byte, while the most significant bit of each byte is set to zero. The output of the system of FIG. 12 is similarly segmented, but the output pixels are each 8-bits wide. The least significant bit of each output pixel is aligned with the least significant bit of each input pixel in the 32-bit register.

In order to simplify the following discussion, a constant attenuation factor α of 0.5 will be assumed, initially. Subsequent discussion will assume an attenuation factor α which is a piece-wise constant function of the input. The input vector X(n) and a delayed 1200 and bit-aligned 1201 output vector Y(n−1)>>1 are first subtracted 1203. Of course, a shift right will move low order bits from higher segments in the register into the high order bits of lower segments in the register. Therefore, the bit aligning step 1201 also includes masking the result as 7-bit values within each 8-bit segment.

The segments comprising the four pixels of the input vector X(n) and the segments comprising the four pixels of the output vector Y(n−1) are aligned, as has been previously described. Therefore, this difference operation 1203 directly produces in each of the four segments the elements of a difference vector 1205. The difference vector 1205 is then added to the delayed output Y(n−1) at 1211, so as to produce a new output vector F, applied to one side of multiplexor 1213. The above-described operations are simply represented as the following pseudo code:

temp=(Y(n−1)>>1) & 0x7F7F7F7F;
   diff=X(n)−temp;
   F=Y(n−1)+diff; . . .

Filtering four pixels simultaneously in this manner results in a reduction of operations required to approximately one-quarter of the number required for non-simultaneous filtering. The number of operations required using the invention is somewhat greater than one-quarter the number of operations required for serial processing, because of some overhead required to perform parallel operations, such as the masking step (&).

In order to combine the above-described system with a piece-wise constant attenuation factor α, the following operations are performed. As described above, for serial pixel processing, the proper choice of attenuation factor α is made on the basis of comparing 1215 the difference 1205 to a threshold 1217. However, in the parallel processing embodiment currently being described, the difference for each individual pixel is not considered. Rather, if the difference for any pixel within a group of four exceeds the threshold, then the next higher attenuation factor α is used for all four pixels. The result of the comparison 1215 is used by the multiplexor 1213 to select as output Y(n) either X(n)×2, produced by gain block 1214, or the filtered value F=Y(n−1)+[X(n)−(Y(n−1)>>1)]. Thus, using the techniques of the present invention, described herein above, and a threshold of 16, the operation of the filter is expressed by the following pseudo code:

temp=diff+0x08080808;
   temp=temp & 0xF0F0F0F0;
   if(temp==0)

Y(n)=F (=Y(n−1)+diff);

else

Y(n)=X(n)<<1;

The operations described above approximately implement the following:

if(−8<=diff<8) apply filter;

else no filter.

Notice that the right shift 1201, which bit aligns Y(n−1) with X(n) also scales Y(n−1) to Y(n−1)/2, resulting in the threshold of 16 being implemented as a post-scaling threshold of 8.

Also, due to the overflow from one segment to the next, the threshold applied against the upper three segments by the comparator 1215 is not exactly 8, but rather varies between 7 and 8 if the difference in that segment is positive, and between −8 and −9 if the difference in that segment is negative. This occurs because the actual threshold applied to a higher order segment depends on whether the next lower order segment in the 32-bit register is negative, causing a sign bit to be carried into the higher order segment. Again, the savings in operations performed, compared to serial processing of pixels is approximately one-quarter, but this saving is also reduced somewhat by the overhead operations required.

The present invention has been described and illustrated in connection with a specific embodiment thereof. However, the foregoing description is not to be taken as limiting. Numerous variations and modifications contemplated as falling within the scope of the present invention should now occur to those skilled in the art. Therefore, the scope of the invention is not to be limited, except by scope of the appended claims.

What is claimed is:

1. A method of processing image signals in an arithmetic/logic unit having a register including a plurality of segments, each segment accommodating predetermined numbers of bits, and in which carry bits are propagated by operation in the arithmetic/logic unit from a lower order segment of the register to a higher order segment of the register, the method comprising the steps of:

reciving a digital image signal formed of a sequence of digitial sample representative of numerical values, wherein the digital sample form sets in which at least one anticipated processing step is performed identically upon each digital sample in each set and wherein each set includes a digital sample represented by a number of bits corresponding to one of the plurality of segments;

loading into contiguous adjacent segments of a single register, without unused bits therebetween, a set of first operands taken from a group including a first set of digital samples and a set of digital samples arranged to have correspondence with the segments of the single register, a second set of operands formed by a remainder of the group;

performing an arithmetic/logic unit function that causes carry bits to be propagated, the function perform simultaneously between all the digital samples of the first set of operands and the second set of operands, forming a new set of digital samples in the register; and providing as a processed digital signal, a new sequence of the set of new digital samples.

2. The method of claim 1, wherein the step of performing further comprises the step of:

performing an arithmetic/logic unit function which combines the first set of digital samples with a second set of digital samples, the second set of digital samples arranged in a computer memory in alignment with the adjacent segments in the single register and loaded therefrom in a single operation.

3. The method of claim 1, further comprising the step of:

arranging the digital image signal in a computer memory such that contiguous adjacent locations in the computer memory contain portions of the digital image signal which form the first set of digital samples, such that the first set of digital samples are aligned for loading into the register in a single operation.

4. The method of claim 3, wherein the step of arranging further comprises the step of:

storing corresponding digital samples of sequential frames in the digital image signal into said adjacent locations.

5. The method of claim 3, wherein the step of arranging further comprises the step of:

storing into said adjacent locations digital samples corresponding to pixels in adjacent blocks of pixels within one frame in the digital image signal.

6. The method of claim 1, further comprising the steps of:

generating a statistically expected error signal corresponding to a statistical expectation of the error caused by the carry; and subtracting from one or more of the plurality of new digital samples the statistically expected error signal, when the statistically expected error signal is greater than a predetermined threshold.

7. A method of processing signals in an arithmetic/logic unit having a register including a plurality of segments, each segment accommodating predetermined numbers of bits, and in which carry bits are propagated by operations in the arithmetic/logic unit from a lower order segment of the register to a higher order segment of the register, the method comprising the steps of:

receiving a digital signal formed of a sequence of digital samples representative of numerical values, wherein the digital samples form sets in which at least one anticipated processing step is performed identically upon each digital sample in each set and wherein each set includes a digital sample represented by a number of bits corresponding to one of the plurality of segments;

loading into contiguous adjacent segments of a single register, without unused bits therebetween, a set of first operands taken from a group including a first set of the digital samples and a set of digital samples arranged to have correspondence with the segments of the single register, a second set of operands formed by a remainder of the group;

performing an arithmetic/logic unit function that causes carry bits to be propagated, the function performed simultaneously between all the digital samples of the first set of the operands and the second set of operands, forming a new set of digital samples in the register; and providing as a processed digital signal, a new sequence of the new set of digital samples.

8. The method of claim 7, wherein the step of performing further comprises the step of:

performing an arithmetic/logic unit function which combines with the first set of digital samples a second set of digital samples arranged in a computer memory in alignment with the adjacent segments in the single register.

9. The method of claim 7, further comprising the step of:

arranging the digital signal in a computer memory such that adjacent locations in the computer memory contain portions of the digital signal which form the first set of digital samples, such that the first set of digital samples may be loaded into the accumulator in a single operation.

10. The method of claim 7, further comprising the steps of:

generating a statistically expected error signal corresponding to a statistical expectation of the error caused by the carry; and subtracting from one or more of the plurality of new digital samples the statistically expected error signal, when the statistically expected error signal is greater than a predetermined threshold.

11. A method of processing digital image signals, comprising the steps of:

representing the digital image signal as a sequence of pixel signals;

loading into adjacent segments in a single register a first plurality of pixel signals;

subtracting from the first plurality of pixel signals a second plurality of pixel signals, thereby producing in the single register a plurality of difference signals;

propagating an error introduced by one of the plurality of difference signals to another of the plurality of difference signals;

comparing the difference signals with a predetermined range;

adding to the difference signals a third plurality of pixel signals, the third plurality of pixel signals and the second plurality of pixel signals having values related by a first constant factor, thereby producing a fourth plurality of pixel signals;

selecting as an output plurality of pixel signals the first plurality of pixel signals scaled by a second constant factor when any of the plurality of difference signals lies outside the predetermined range and selecting as the output plurality of pixel signals the fourth plurality of pixel signals when none of the plurality of difference signals lies outside the predetermined range;

delaying the output plurality of pixel signals by one frame, thereby producing the third plurality of pixel signals; and assembling the output plurality of pixel signals into a sequence forming a new digital image signal.

12. The method of claim 11, wherein the step of comparing the difference signals with a threshold further comprises the steps of:

adding a plurality of copies of the threshold to the difference signals in the single register to form a plurality of test signals in the single register, such that an error introduced by a test signal in one segment of the single register is propagated to a test signal in an adjacent segment of the single register;

masking off portions of the plurality of test signals; and comparing the masked plurality of test signals with zero, treating the masked plurality of test signals in the single register as a single value.

13. A method of processing image signals, comprising the steps of:

receiving an image signal;

representing the image signal as a digital image signal formed of a sequence of digital samples representative of numerical values;

categorizing the digital samples into sets, each set including a plurality of digital samples;

loading into adjacent segments of a single register a first set of digital samples;

adding to the first set of digital samples in the single register a second set of digital samples, forming a new set of digital samples in said adjacent segments;

propagating an error introduced by one of the adjacent segments to another of the adjacent segments;

multiplying the new set of digital samples in said adjacent segments by a constant; and adding to the multiplied new set of digital samples in the register a third set of digital samples;

propagating an error introduced by one of the adjacent segments to another of the adjacent segments.

14. A method of processing image signals, comprising the steps of:

receiving an image signal representative of an image having at least two orthogonal dimensions;

representing the image signal as a digital image signal formed of a sequence of digital samples representative of numerical values;

categorizing the digital samples into sets, each set including a plurality of digital samples taken along a first dimension of the two orthogonal dimensions;

loading into adjacent segments of a single register a first set of digital samples;

adding to the first set of digital samples in the single register a second set of digital samples, forming a set of new digital samples in said adjacent segments;

forming a new sequence of the new digital samples;

categorizing the new digital samples into sets of new digital samples taken along a second dimension of the two orthogonal dimensions;

loading into the adjacent segments of the single register a first set of new digital samples; and adding to the first set of new digital samples in the single register a second set of new digital samples.

\* \* \* \* \*